(12) United States Patent
Thyagarajan et al.

(10) Patent No.: US 12,392,535 B2
(45) Date of Patent: Aug. 19, 2025

(54) SYSTEM AND METHOD FOR CONTROLLING CRYSTALLIZED FORMS OF WATER

(71) Applicant: XEROX CORPORATION, Norwalk, CT (US)

(72) Inventors: Krishnan Thyagarajan, Sunnyvale, CA (US); Christopher Somogyi, Wimberley, TX (US)

(73) Assignee: XEROX CORPORATION, Norwalk, CT (US)

( * ) Notice: Subject to any disclaimer, the term of this patent is extended or adjusted under 35 U.S.C. 154(b) by 154 days.

(21) Appl. No.: 17/875,939

(22) Filed: Jul. 28, 2022

(65) Prior Publication Data

US 2024/0035725 A1 Feb. 1, 2024

(51) Int. Cl.
| F25C 1/22 | (2018.01) |
| A23B 2/60 | (2025.01) |
| A23B 2/80 | (2025.01) |

(52) U.S. Cl.
CPC .............. *F25C 1/22* (2013.01); *A23B 2/60* (2025.01); *A23B 2/80* (2025.01); *A23V 2002/00* (2013.01); *F25C 2400/12* (2013.01); *F25C 2600/04* (2013.01)

(58) Field of Classification Search
CPC .... F25C 1/22; F25C 2400/12; F25C 2600/04; A23L 3/32; A23L 3/36; A23V 2002/00
See application file for complete search history.

(56) References Cited

U.S. PATENT DOCUMENTS

| 2,438,582 | A | 3/1948 | Southerwick |
| 7,237,400 | B2 | 7/2007 | Owada |
| 8,464,544 | B2 | 6/2013 | Shin et al. |
| 10,588,336 | B2 | 3/2020 | Jun et al. |
| 2002/0005043 | A1 | 1/2002 | Rudick et al. |
| 2007/0163275 | A1 | 7/2007 | Ha et al. |
| 2007/0163289 | A1 | 7/2007 | Hahm et al. |
| 2007/0196543 | A1 | 8/2007 | Lee et al. |
| 2008/0053124 | A1 | 3/2008 | Cho et al. |

(Continued)

FOREIGN PATENT DOCUMENTS

| CN | 108865881 | 11/2018 |
| CN | 110462314 | 11/2019 |

(Continued)

OTHER PUBLICATIONS

Laura Otero et al. "Effects of Magnetic Fields on Freezing: Application to Biological Products: Magnetic freezing of biological products?", Comprehensive Reviews in Food Science and Food Safety; vol. 15, No. 3, May 1, 2016 (May 1, 2016), pp. 646-667, XP055495395, US ISSN: 1541-4337, DOI: 10.1111/1541-4337. 12202, p. 643, left-hand column.

(Continued)

*Primary Examiner* — Cassey D Bauer
(74) *Attorney, Agent, or Firm* — Krista A. Wittman (57) ABSTRACT

A method for forming crystallized forms of water is provided. Water is maintained in a container. A field is applied to the water, and the water is maintained in liquid form at a below freezing temperature via the applied field. Movement of the water in liquid form is created out of the container and ice is formed from the water upon the movement from the container.

11 Claims, 4 Drawing Sheets

(56) References Cited

U.S. PATENT DOCUMENTS

| | | |
|---|---|---|
| 2008/0245079 A1 | 10/2008 | Lim et al. |
| 2008/0245081 A1 | 10/2008 | Shin et al. |
| 2011/0165553 A1 | 7/2011 | Elliott et al. |
| 2013/0202752 A1 | 8/2013 | Tao |
| 2015/0118369 A1 | 4/2015 | Hyde et al. |
| 2015/0233631 A1 | 8/2015 | Shuntich |
| 2015/0264968 A1 | 9/2015 | Shuntich |
| 2017/0181455 A1 | 6/2017 | Bullo et al. |
| 2018/0045458 A1 | 2/2018 | Shuntich |
| 2018/0149422 A1 | 5/2018 | Spivey et al. |
| 2018/0180353 A1 | 6/2018 | Shuntich |
| 2019/0126203 A1 | 5/2019 | Biegelsen et al. |
| 2020/0056819 A1 | 2/2020 | Inada et al. |
| 2020/0312078 A1 | 10/2020 | Deshpande et al. |
| 2020/0323246 A1 | 10/2020 | Jacobs et al. |
| 2021/0131718 A1 | 5/2021 | Jeong et al. |
| 2021/0161182 A1 | 6/2021 | Stoenescu et al. |
| 2021/0403854 A1 | 12/2021 | Koren et al. |
| 2022/0003493 A1 | 1/2022 | Park et al. |
| 2022/0118136 A1 | 4/2022 | Church et al. |
| 2022/0211278 A1 | 7/2022 | Dede et al. |

FOREIGN PATENT DOCUMENTS

| | | |
|---|---|---|
| CN | 110906627 | 3/2020 |
| CN | 110953797 | 4/2020 |
| CN | 214593076 | 11/2021 |
| EP | 0765606 | 4/1997 |
| EP | 0584127 | 12/1997 |
| EP | 1980809 | 10/2008 |
| EP | 2499924 | 9/2012 |
| GB | 2476834 | 7/2011 |
| JP | 2005291525 | 10/2005 |
| JP | 2009030961 | 2/2009 |
| KR | 20080003136 | 1/2008 |
| KR | 20080088943 | 10/2008 |
| KR | 20180054120 | 5/2018 |
| KR | 20220043324 | 4/2022 |
| WO | 2006100740 | 9/2006 |
| WO | 2008004761 | 1/2008 |
| WO | 2008004765 | 1/2008 |
| WO | 2008153285 | 12/2008 |
| WO | WO-2008150104 A2 * | 12/2008 ............... F25C 1/04 |
| WO | 2015089112 | 6/2015 |
| WO | 2018187840 | 10/2018 |
| WO | 2020023747 | 1/2020 |
| WO | 2020138148 | 7/2020 |
| WO | 20210146122 | 7/2021 |

OTHER PUBLICATIONS

Pirouzian Haniyeh Rasouli et al: "Pre-crystallization process in chocolate: Mechanism, importance and novel aspects", Food Chemistry, Elsevier Ltd, NL, vol. 321, Apr. 1, 2020 (Apr. 1, 2020), XP086133616, ISSN: 0308-8146, DOI: 10.1016/J.FOODCHEM. 2020.126718 [retrieved on Apr. 1, 2020].

* cited by examiner

SYSTEM AND METHOD FOR CONTROLLING CRYSTALLIZED FORMS OF WATER

FIELD

This application relates in general to ice formation and in particular, to a system and method for controlling crystallized forms of water.

BACKGROUND

Due to increasing temperatures, ice consumption is rising. In 2020, the North American market accounted for 31% of the global share in consumption. However, ice production is energy intensive and requires the cooling of water until converted to ice. Further, ice requires large storage areas since ice expands when water is frozen so more space is required to store ice than water. However, storing water until ice is needed, requires periods of advance notice for cooling the water to a freezing temperature to form the ice. Further, in large quantities, storage space is still required while the order is being fulfilled.

Supercooling utilizes fields, including magnetic and electromagnetic fields, as described in U.S. Pat. No. 10,588,336, to Jun, to help preserve the physical, nutritional, and sensory characteristics of an object, while subjecting the object to a temperature below the freezing point of water without freezing the object itself. This is enabled by the suppression or prevention of phase change of both intracellular and intercellular water in the intended object, including biological items. The fields can include a pulsed/oscillating electric field, pulsed/oscillating magnetic field, or a combination of fields to reorient and induce vibration of water molecules in the object (among other physico-chemical controls), thus suppressing or preventing the formation of ice from the water molecules.

However, conventional techniques for supercooling do not account for differences in the biological items' characteristics and do not allow for a near-real-time assessment of the status of the supercooled object to provide a closed-loop feedback, thus complicating achieving a desired result. In particular, achieving a state of supercooling requires an approach tailored to individual characteristics of the objects being supercooled. For instance, based on the composition of a specific object, different field characteristics such as field strength, frequency, phase, and waveform, are necessary. Determining the correct characteristics and their values in order to achieve supercooling and prevent ice-nucleation can be difficult to determine due to many factors, including size, shape, and content of the object, and many of the general public may experience difficulty in maintaining supercooling conditions based on a lack of knowledge of object composition and lack of monitoring capabilities. In addition, the fields that were appropriate previously, may no longer be suitable for continuing the supercooling process.

Accordingly, a feedback system to monitor water and adjust parameters of the field to reach and maintain supercooling without freezing of the water is needed. Preferably, the water maintains a supercooled state until ice is needed and can be created on demand from the supercooled water.

SUMMARY

As part of the ice production process, water can be maintained as a liquid, rather than a solid, in a supercooled state between −1° C. to −30° C. until ice is needed. Upon a request for ice, such as from a consumer, water is poured into a mold or removed from the supercooled state to generate ice on demand. Specifically, the supercooled water when poured into a mold, will instantaneously turn into ice on demand due to the extremely low temperature. At such low temperatures, the ice will melt slower than traditional ice since the starting temperature of the ice is much lower.

To maintain the supercooled state, a feedback system controls the phase change of water as a liquid to ice as a solid. The feedback system identifies characteristics of the water and utilizes the characteristics to initiate and adjust a field applied to the water. In one embodiment, the system leverages machine learning to automatically identify a condition of the object and adjust the supercooling parameters. Sensors are utilized during supercooling to monitor a condition of the object being supercooled. Specifically, characteristics of the object are measured at different points, areas, or volumes on the object and the measurements are used to determine whether supercooling is being achieved or whether the object is starting to freeze. Based on the measurements, parameters of the field can be adjusted to ensure supercooling of the object without freezing.

An embodiment provides a method for forming crystallized forms of water. Water is maintained in a container. A field is applied to the water, and the water is maintained in liquid form at a below freezing temperature via the applied field. Movement of the water in liquid form is created out of the container and ice is formed from the water upon the movement from the container.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

As the demand for ice increases, storage required to maintain the ice becomes harder to find. Ice is less dense than water and takes up more space. Maintaining water in liquid form is ideal; however, conventional methods for generating ice are energy intensive and requires time for the water to convert to a solid state. Supercooling can be used to maintain water at below freezing temperatures, such as between −1° C. to −30° C., while in liquid form. To generate ice, the supercooled water is moved, such as by being poured into a mold or tapping a container of the supercooled water.

Figure 1:
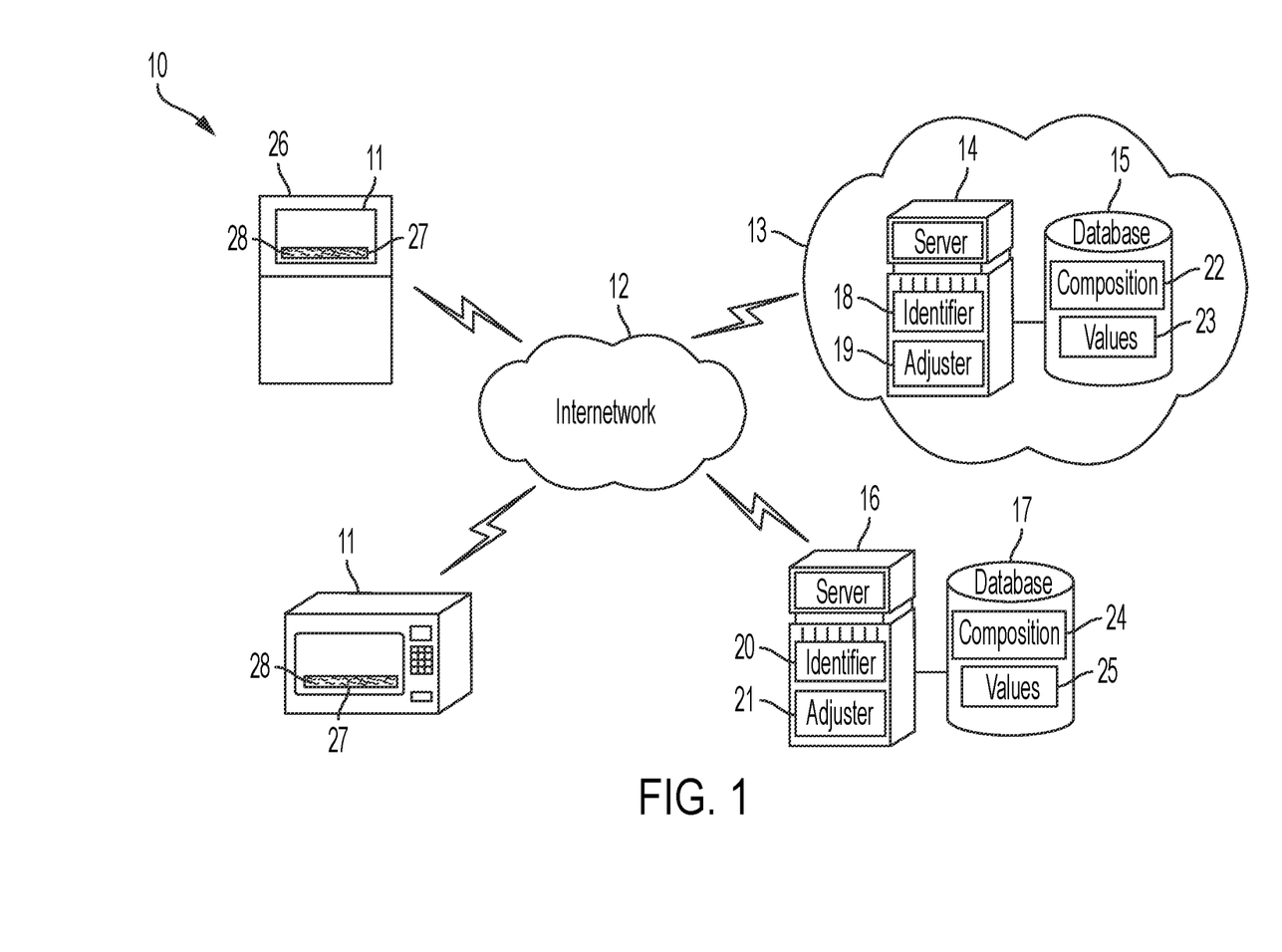
FIG. 1 is a block diagram showing a system for feedback-based supercooling in accordance with one embodiment.

To ensure nucleation of the water does not begin prior to a time when ice is needed, a feedback system monitors characteristics or conditions of the water. The feedback system can determine new parameters for the supercooling fields applied, and make adjustments to the fields based on the new parameters. FIG. 1 is a block diagram showing a system 10 for feedback-based supercooling in accordance with one embodiment. A supercooling device 11 can supercool an object 27, such as water, to a temperature below the freezing point of water, without freezing by applying one or more fields to the water, including magnetic, electric, and electromagnetic fields. The water 27 can be housed in a container 28, such as a pan, tray, bottle, can, or other type of container, which is placed into the supercooling device 11.

Figure 3:
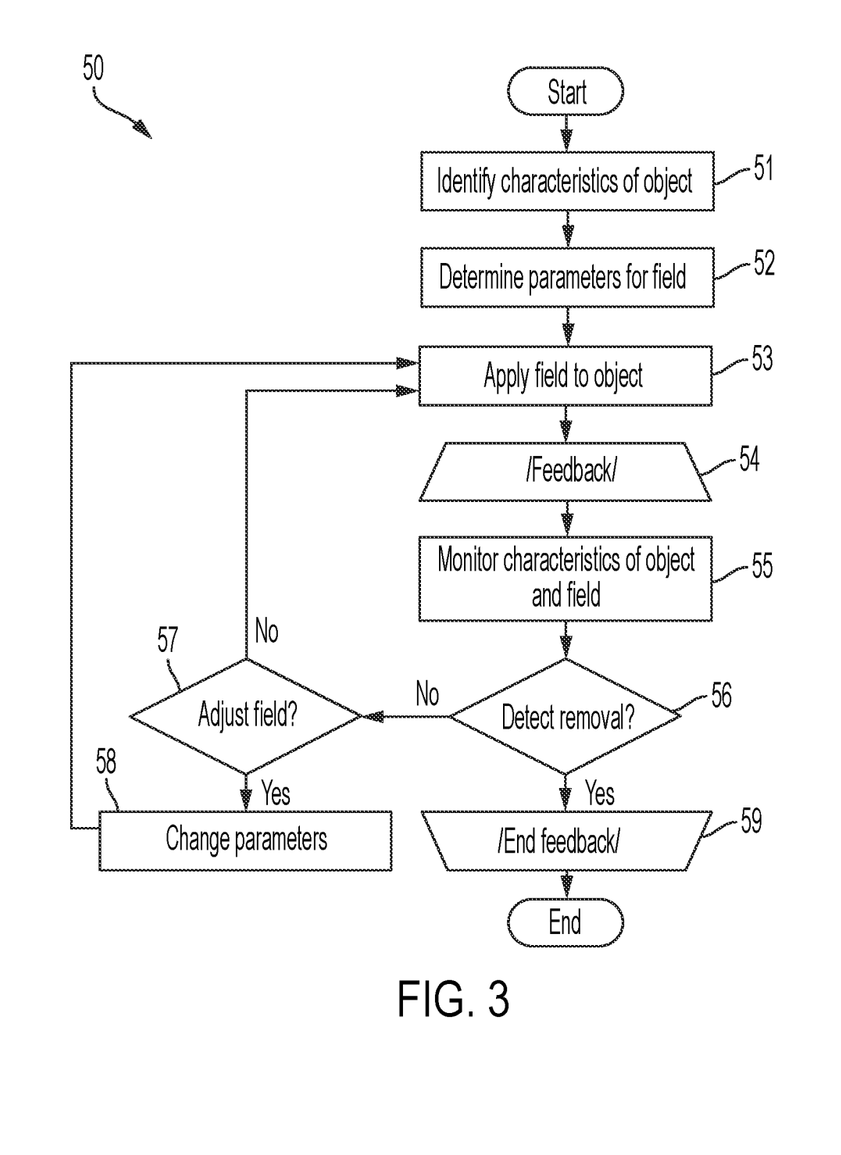
FIG. 3 is a flow diagram showing a method for feedback-based supercooling in accordance with one embodiment.

The supercooling device 11 can be a standalone device or can be incorporated into an appliance, such as a refrigerator or another freezer 26, and is described in detail below with respect to FIG. 3. When incorporated into another appliance that has a cooling function, the supercooling device utilizes that cooling function to lower the temperature of the water. However, when used as a standalone device, the supercooling device can include a cooling system to lower the temperature of the water to a range of −1° C. to −30° C.

The supercooling device 11 communicates with a feedback server 14, 16 via an internetwork 12, such as the Internet or cellular network, to obtain and adjust parameters of the field based on the obtained characteristics. In one embodiment, the feedback server 14 can be a cloud-based server. Alternatively, the server 16 can be locally or remotely located with respect to the supercooling device 11. The feedback server 14, 16 can include an identifier 18, 20 and an adjuster 19, 21. The identifier 18, 20 can utilize measurements for characteristics of the water obtained from the supercooling device 11 to determine an identity or classification of the water based on known composition values 22, 24 of water stored in a database 15, 17 associated with the server 14, 16. Machine learning can also be used in lieu of or in addition to a look up table of compositions and identities or classifications. In a further embodiment, identification or classification of the water can occur on the supercooling device 11, such as via a processor, which is described in detail below with respect to FIG. 3.

The adjuster 19, 21 utilizes data obtained from the supercooling device 11 regarding the water and the field to determine whether the field should be adjusted to ensure an appropriate supercooling temperature is reached, without allowing nucleation of ice via the water content in the water. The adjustment can be determined using characteristic values 23, 25 for the water and parameter values for the field, which are stored by the databases 15, 17 to determine new parameter values for the field. In a further embodiment, ranges of water characteristics and field parameters can be stored on the supercooling device 11 for use in adjusting the supercooling fields applied to the water. Alternatively, machine learning can also be used to determine and adjust field parameters in lieu of a stored look up table of characteristic values and parameters to maintain proper supercooling conditions for the water.

Figure 2:
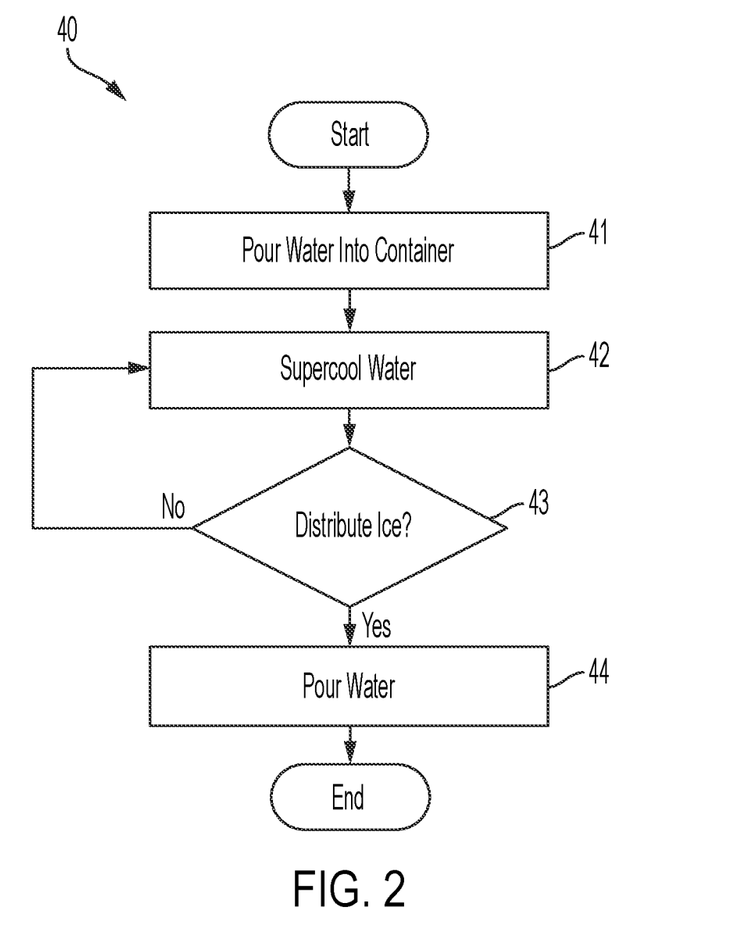
FIG. 2 is a flow diagram showing a process for controlling crystallized forms of water, in accordance with one embodiment.

At any time, once the water has reached a supercooled state, ice can be generated on demand. FIG. 2 is a flow diagram showing a process 40 for controlling crystallized forms of water, in accordance with one embodiment. As part of the process for generating ice, water is poured (step 41) into a container for placing into a supercooling device. In a further embodiment, another liquid, such as juice, alcohol, syrups or other liquids, can be placed in the supercooling device with the water to create ice that releases flavor or color upon melting.

The water is supercooled (step 42) by bringing a temperature of the water down to a range between −1° C. to −30° C., while fields are applied to the water to introduce movement to the water molecules, which prevents nucleation of the water. During supercooling, the water is also monitored to ensure the water remains in a supercooled state and no nucleation has or is beginning to occur. If necessary, the fields can be adjusted, as further described below with respect to FIG. 3.

At some point, ice is needed for distribution (step 43) and movement or pressure is applied to the supercooled water to instantaneously form ice on demand. The ice can form instantaneously once the fields are removed from the water, which is at a temperature below freezing, and is poured (step 44) into a mold, such as an ice cube tray or container. Alternatively, if the water is supercooled in a bottle, the bottle can be tapped by a machine or user and the water within the bottle will become solid. Since the temperature of the ice is so much lower than traditional ice, the supercooled water-turned ice will last longer. When a flavored or colored liquid is mixed with the water, the flavor or color will be released when the ice melts over time and creates a timed release. If the water is not yet needed for ice, monitoring of the supercooled water continued (step 42) until a request for ice is received.

Monitoring of the water can result in adjusting parameters of the fields applied during supercooling to maintain supercooling conditions of the water, while preventing ice-nucleation and freezing. FIG. 3 is a flow diagram showing a method 50 for feedback-based supercooling in accordance with one embodiment. Water, which will eventually be used to form ice, is placed into a supercooling device with or without another liquid, such as a flavored liquid or colored liquid. A composition or particular characteristics of the water can be identified (step 51) via sensors. For example, one or more sensors can send signals towards the water and information about the water is obtained via the signal, which is returned back to the sensor. Passive and active sensors can be used, including imaging and reflective sensors, as well as electrocurrent sensors, optical sensors, chemical sensors, electrochemical sensors, acoustic sensors, and hyperspectral imaging. Measures for characteristics, such as water content, purity, density, size, and shape, as well as other characteristics, can be obtained via the sensors. For example, hyperspectral imaging can be used to determine a surface roughness or chemical composition of the water. The identified characteristics can be used to classify the water as a type of food or identify the specific food object.

In one embodiment, the identified characteristics can be used to classify the water or determine an identity of the water. A classification can group the water into a category of a liquid or beverages, including water-based or milk-based beverages, while an identity can include a name of the water. For example, water can be distinguished from juice based on the extremely high water content and lack of sugar, which is generally present in juice. Further, water is transparent, whereas juice has a color based on the ingredients used.

Classification or identification of the water can occur via a camera, using a look up table, be provided by a user, or determined via machine learning. When used, a camera can obtain an image of the water that can be compared with a database of images to determine an identity of the water. The look up table can include characteristics, values for the characteristics, and identities or categories for the water based on the identified characteristics and values.

If user provided, the user can provide the characteristics of the water or an identity of the water by entering the characteristics or identity into the supercooling device or an application for the supercooling device. Alternatively, during machine learning, values for the characteristics are input to classify the water as having a particular identity or belonging to a particular category.

Initial parameters for a field applied during supercooling can be determined (step 52) based on the characteristics of the water, or the identity or classification of the water, if known. Specifically, when an identity of the water is not known, one or more of the characteristics can be used to determine a type of field and initial parameters for the determined field. The field can include a magnetic field, electric field, an electromagnetic field, or a combination of fields. Other types of fields are possible.

Meanwhile, the field parameters can include amplitude, frequency, phase, waveform, and duration, as well as other types of parameters. Values for the parameters can be determined using a look up table, which can provide field parameter values for the water based on a characteristic or a combination of characteristics, or based on an identity or classification of the water. In a further embodiment, machine learning can be used to determine the initial field parameters. The learning can be performed based on data sets of the characteristic values and parameters for fields to be applied to different objects, including biological items, food, beverages, and other objects. Once the parameters are determined, the field is then applied (step 53) to the water based on the values of the parameters to initiate supercooling of the water.

To maintain supercooling conditions, such that the water does not begin to freeze, a feedback system is run (step 54). In one embodiment, desirable supercooling conditions can include a temperature range of about −1° C. to −30° C. While undergoing supercooling, the water can be monitored (step 55) continuously or at predetermined time periods to determine a condition of the water. For example, characteristics of the water can be monitored, including temperature, impedance, hyperspectral imaging, acoustic sensing, and visible and infrared imaging. The water can be monitored at different spatial points at different times or at the same time. Characteristics of the applied field can also be monitored (step 55), including wavelength, frequency, phase, amplitude, waveforms, and duration. If at any time, removal of the water from the supercooling device is detected (step 56), monitoring of the water ends and the feedback system and supercooling process is completed for the water (step 59).

However, if the water remains in the supercooling device under supercooling conditions, the monitored characteristics of the water and field can be used to determine whether the field needs to be adjusted (step 57). If the water is determined to be under appropriate supercooling conditions, such that the water reaches a temperature between −1° C. and −30° C., and no nucleation of the water molecules in the water has commenced, no adjustments may be necessary and the field is continued (step 53). For example, ultrasonic sensors can be used to identify air pockets within an object and thus, a density of the water. If the water becomes less dense, ice may be forming.

If nucleation or freezing is beginning, the density of the water can change as expansion of the water occurs due to less strong hydrogen bonds between water molecules. The propagation of sound through ice and water are different as well, thus acoustic sensors can be used to determine the beginning of the formation of ice (if it occurs).

If the water appears to be close to or actually undergoing nucleation, adjustments to the field parameters should be made (step 58). The parameter adjustments can include a change in amplitude, frequency, phase, waveform, wavelength, and duration of the field, which can affect mobility, physical movement or ability of phase-change of water molecules to prevent or reverse nucleation. The field changes can be made manually or automatically. In one embodiment different formulas can be used to determine new parameter values based on the monitored characteristics of the water, as well as a graph of water characteristics and calibration of the fields. The chart can include values for the listed characteristics with standard deviations and known progression of time with temperatures for the water with a particular characteristic or combination of characteristics to achieve supercooling. In a different embodiment, machine learning can be used to determine new values for the field parameters.

Returning to the above example, after the carrot is determined to be undergoing nucleation or freezing, the field parameters can be adjusted. New values of the parameters can be determined via machine learning or a graph. For instance, if freezing is occurring, the frequency and wavelength of the field application to the carrot may be increased to result in additional mobility of the water molecules to prevent freezing. After the parameters are changed, the field is applied (step 53) to the water using the adjusted parameters and the feedback process continues (step 54). For example, a magnetic field can be changed by moving the magnets closer to or away from the water, or moving the magnets relative to one another. Movement of the magnets can be manual or automated.

Figure 4:
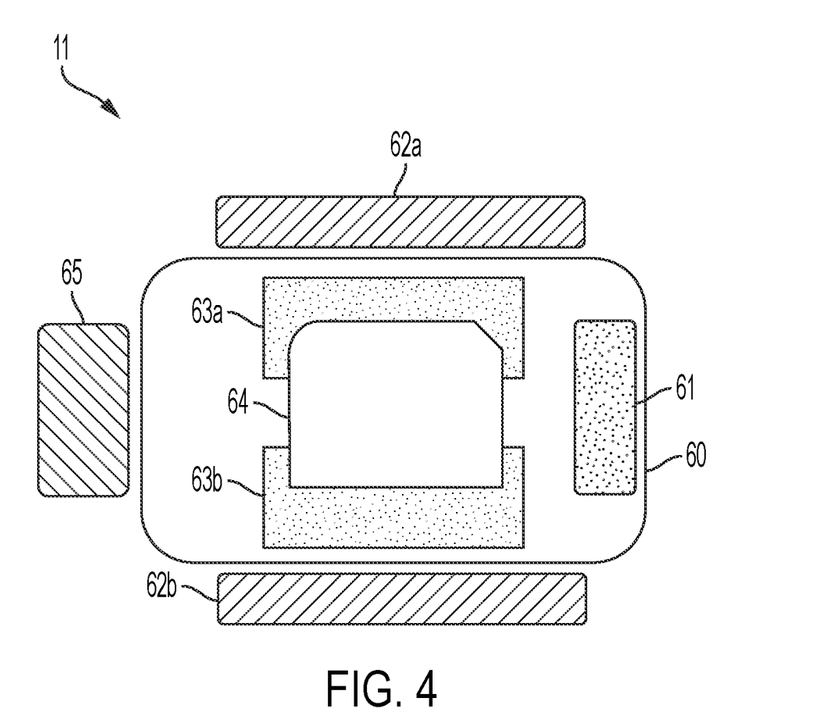
FIG. 4 is a block diagram showing, by way of example, a device for feedback-based supercooling.

The feedback device used to perform supercooling can vary in size depending on the objects to be supercooled. FIG. 4 is a block diagram showing a top view of a device 11 for feedback-based supercooling in accordance with one embodiment. The supercooling device 11 can include a repository 60 in which an object 64, such as water, is placed to undergo supercooling. The repository 60 can include a container, pan, or other type of repository for holding the water 64. In one embodiment, the repository 60 is placed into a standalone housing (not shown), similar to a microwave, to initiate supercooling or alternatively, can be incorporated into an appliance, such as a refrigerator.

One or more field generators 62 *a,b*, 63 *a,b* can be positioned with respect to the repository 60. The field generators can each include a magnet, electrode, wires, electromagnets, or other material systems, such as 2D materials, including for example, graphene, van-der-waals layered materials or organic conductive polymers. For example, electrodes 63 *a,b* can be positioned on a bottom side of the receptacle, along an interior surface, to generate a pulsed electric field. Other positions of the electrodes are possible, including on opposite sides (not shown) of the repository 60. When placed in a position other than the bottom of the receptacle, the electrodes can be affixed to walls of the standalone housing or walls of a housing, such as an appliance. The electrodes can be positioned to contact the water or in a further embodiment, can be placed remotely from the water.

The supercooling device 11 can also include at least one magnet 62 *a, b*, such as an electromagnet, a permanent magnet, or a combination of magnets, to generate an oscillating magnetic, electric or electromagnetic field. Time-varying magnetic fields can be used to create electric fields and vice-versa. The magnets can be positioned along one or more sides of the repository 60, or can be affixed to the repository itself or the housing in which the repository is placed. In a further embodiment, the magnets can be remotely located from the repository and the field emitted from the magnets can be applied to the water via one or more transducers.

Further, at least one closed-loop monitoring sensor 61 can be provided adjacent to the repository on one or more sides. Alternatively or in addition, a sensor can be affixed to the housing, on an interior surface, in which the repository is placed for supercooling. The monitoring sensors can include imaging and reflective sensors, electrocurrent sensors, chemical sensors, electric sensors, acoustic sensors, optical sensors, electrochemical sensors, thermal sensors and imagers, and hyperspectral sensors. However, other types of sensors are possible.

An electrical control unit 65 can be a processor that is interfaced to the sensors 61, magnets 62 $a,b$, and electrodes 63 $a,b$ to communicate during the feedback process. Specifically, the processor can determine an identity of or classify an object, such as water, for supercooling based on measurements from the sensors 61, as well as identify parameters for the field to be applied based on the identity or classification. The processor can also instruct the sensors 61 to measure characteristics of the water object undergoing supercooling and in turn, receive the measured values as feedback for determining if new parameters of the field are needed and if so, values of the parameters. Based on the feedback from the sensors, the processor can communicate the new parameter values with the magnets and electrodes to change the field applied to the water for changing the supercooling conditions.

In a further embodiment, the processor can obtain data from the sensors, electrodes, and magnets for providing, via a wireless transceiver included in the device, to a cloud-based server for determining an identity or classification of the water, determining initial parameters for the field, and identifying new field parameters for adjusting the field. When performed in the cloud, the data set of object identities and classifications, initial parameters, and guidelines for adjusted parameters can be utilized by different users. In contrast, when the processor of the supercooling device performs such actions, the data sets are specific to that supercooling device.

A cooling component, such as a compressor and coils, can be included in the feedback device 11 or the feedback device, when installed in a refrigerator or freezer, can utility the cooling components of the refrigerator or freezer. Additionally, the feedback device can include a dispenser for the distribution of ice. The dispenser can receive the supercooled water from the container that includes a crank or other type of machinery to crush the ice as it turns from liquid to a solid. The dispenser can also include a spout to release the ice when a lever or button is pushed. In a further embodiment, a dispenser is not needed if a user or other machinery pours the supercooled water into a container or mold in which the ice forms and can then be dispensed.

While the description above focuses on supercooling water, the supercooling device and process can also be applied to different kinds of objects, including raw, preserved or cooked foods, blood, embryos, vaccines, probiotics, medicines, sperm, tissue samples, plant cultivars, cut flowers and other plant materials, biological samples of plants, animal, microbial, and fungal materials, non-biologicals, such as hydrogel materials, material that can be impacted by water absorption, such as textiles, nylons and plastic lenses and optics, fine instruments and mechanical components, heat exchangers, and fuel, as well as carbonated beverages as described in commonly-assigned U.S. Patent application, entitled "System and Method for Feedback-Based Beverage Supercooling," Ser. No. 17/876,049, filed Jul. 28, 2022, pending; organic items as described in commonly-assigned U.S. Patent application, entitled "System and Method for Feedback-Based Nucleation Control," Ser. No. 17/876,010, filed Jul. 28, 2022, pending and commonly-assigned U.S. Patent application, entitled "Feedback-Based Device for Nucleation Control," Ser. No. 17/875,957, filed Jul. 28, 2022, pending, colloids as described in commonly-assigned U.S. Patent application, entitled "System and Method for Feedback-Based Colloid Phase Change Control," Ser. No. 17/875,969, filed Jul. 28, 2022, pending; agriculture as described in commonly-assigned U.S. Patent application, entitled "System and Method for Controlling Cell Functioning and Motility with the Aid of a Digital Computer," Ser. No. 17/876,065, filed Jul. 28, 2022, pending; lab grown material, including meat, as described in commonly-assigned U.S. Patent application, entitled "System and Method for Controlling Cellular Adhesion with the Aid of a Digital Computer," Ser. No. 17/876,072, filed Jul. 28, 2022, pending; and food as described in commonly-assigned U.S. Patent application, entitled "System and Method for Metamaterial Array-Based Field-Shaping," Ser. No. 17/875,959, filed Jul. 28, 2022, pending the disclosures of which are incorporated by reference. Further, a receptacle packaging can be used to hold objects to prevent the object from touching electrode contacts as described in commonly-assigned U.S. Patent application, entitled "Contact Interfacing Material Receptacle," Ser. No. 17/875,991, filed Jul. 28, 2022, pending, the disclosure of which is incorporated by reference.

While the invention has been particularly shown and described as referenced to the embodiments thereof, those skilled in the art will understand that the foregoing and other changes in form and detail may be made therein without departing from the spirit and scope of the invention.

What is claimed is:

1. A method for forming crystallized forms of water, comprising:
    maintaining water in a container;
    determining an identity of the water via one of machine learning, utilizing a look up table, and provided by a user;
    applying a field to the water;
    maintaining the water in liquid form at a below freezing temperature via the applied field; and
    creating movement of the water in liquid form out of the container in which the water in maintained, wherein ice is formed from the water upon movement from the container.

2. A method according to claim 1, wherein the water is maintained in liquid form at a temperature within a range of −1° C. and −20° C.

3. A method according to claim 1, wherein the field comprises at least one of electromagnetic fields or magnetic or electric fields.

4. A method according to claim 1, wherein the field affects mobility, physical movement or ability of phase-change of molecules within the water.

5. A method according to claim 1, further comprising:
    determining that the object is undergoing nucleation while maintaining the water at a below freezing temperature.

6. A method according to claim 5, further comprising:
    adjusting the field to stop the nucleation.

7. A method for forming crystallized forms of water, comprising:
    maintaining water in a container;
    applying a field to the water;

maintaining the water in liquid form at a below freezing temperature via the applied field;
adjusting the field to stop the nucleation;
determining that the object is undergoing nucleation while maintaining the water at a below freezing temperature; and
creating movement of the water in liquid form out of the container in which the water in maintained, wherein ice is formed from the water upon movement from the container.

8. A method according to claim 7, wherein the water is maintained in liquid form at a temperature within a range of −1° C. and −20° C.

9. A method according to claim 7, wherein the field comprises at least one of electromagnetic fields or magnetic or electric fields.

10. A method according to claim 7, further comprising:
determining an identity of the water via one of machine learning, utilizing a look up table, and provided by a user.

11. A method according to claim 7, wherein the field affects mobility, physical movement or ability of phase-change of molecules within the water.

\* \* \* \* \*